(12) United States Patent
Claussen et al.

(10) Patent No.: US 9,629,096 B2
(45) Date of Patent: Apr. 18, 2017

(54) CONTROLLING UPLINK POWER FOR PICOCELL COMMUNICATIONS WITHIN A MACROCELL

(75) Inventors: Holger Claussen, Swindon (GB); Lester Tse Wee Ho, Swindon (GB); Louis Gwyn Samuel, Swindon (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 3081 days.

(21) Appl. No.: 11/611,230

(22) Filed: Dec. 15, 2006

(65) Prior Publication Data

US 2008/0146154 A1 Jun. 19, 2008

(51) Int. Cl.
*H04B 7/00* (2006.01)
*H04W 52/14* (2009.01)
*H04W 52/24* (2009.01)
*H04W 16/32* (2009.01)
*H04W 52/36* (2009.01)

(52) U.S. Cl.
CPC ....... *H04W 52/146* (2013.01); *H04W 52/244* (2013.01); *H04W 16/32* (2013.01); *H04W 52/367* (2013.01)

(58) Field of Classification Search
CPC .. H04W 16/32; H04W 52/143; H04W 52/244
USPC ................. 455/63.1, 550; 370/328
See application file for complete search history.

(56) References Cited

U.S. PATENT DOCUMENTS

| | | | |
|---|---|---|---|
| 5,822,696 A * | 10/1998 | Bergkvist | 455/436 |
| 6,035,208 A | 3/2000 | Osawa | |
| 6,088,335 A * | 7/2000 | I et al. | 370/252 |
| 6,101,176 A * | 8/2000 | Honkasalo et al. | 370/335 |
| 6,115,596 A | 9/2000 | Raith et al. | |
| 6,438,379 B1 * | 8/2002 | Gitlin et al. | 455/449 |
| 6,449,462 B1 * | 9/2002 | Gunnarsson et al. | 455/67.13 |
| 6,473,624 B1 | 10/2002 | Corbett et al. | |
| 6,754,251 B1 * | 6/2004 | Sriram et al. | 375/145 |
| 6,845,246 B1 * | 1/2005 | Steer | 455/522 |
| 6,850,500 B2 | 2/2005 | Zeira et al. | |
| 6,944,426 B1 | 9/2005 | Esser et al. | |

(Continued)

FOREIGN PATENT DOCUMENTS

| | | |
|---|---|---|
| CN | 1407816 A | 4/2003 |
| EP | 0559949 A2 | 9/1993 |

(Continued)

OTHER PUBLICATIONS

U.S. Appl. No. 11/438,475, filed May 22, 2006, entitled "Controlling Transmit Power of Picocell Base Units".

(Continued)

*Primary Examiner* — German J Viana Di Prisco
(74) *Attorney, Agent, or Firm* — Carlson, Gaskey & Olds, P.C.

(57) ABSTRACT

A method of communicating in a picocell within a macrocell includes automatically setting an uplink transmit power of a mobile station to avoid uplink interference between the picocell and the macrocell. A disclosed example includes determining an allowable interference from the picocell to the macrocell. A path-loss between a mobile station and a macrocell is determined. An uplink transmit power of the mobile station for communicating in the picocell is determined based upon the determined allowable interference and the determined path-loss.

20 Claims, 1 Drawing Sheet

(56) References Cited

U.S. PATENT DOCUMENTS

| | | | |
|---|---|---|---|
| 7,142,861 B2 | 11/2006 | Murai | |
| 7,260,415 B1* | 8/2007 | Oh | 455/522 |
| 7,444,162 B2* | 10/2008 | Hassan | 455/522 |
| 7,593,332 B2* | 9/2009 | Kwon et al. | 370/232 |
| 7,623,857 B1* | 11/2009 | O'Neil et al. | 455/426.1 |
| 2003/0086398 A1* | 5/2003 | Hiltunen | 370/335 |
| 2004/0105406 A1 | 6/2004 | Kayama et al. | |
| 2004/0147276 A1* | 7/2004 | Gholmieh et al. | 455/522 |
| 2004/0252666 A1* | 12/2004 | Johnson | 370/335 |
| 2006/0019665 A1* | 1/2006 | Aghvami et al. | 455/444 |
| 2006/0165032 A1* | 7/2006 | Hamalainen et al. | 370/328 |
| 2007/0253363 A1* | 11/2007 | Bachl et al. | 370/329 |
| 2007/0270151 A1 | 11/2007 | Claussen et al. | |
| 2008/0069028 A1* | 3/2008 | Richardson | 370/328 |
| 2008/0101301 A1* | 5/2008 | Thomas et al. | 370/335 |
| 2008/0260000 A1* | 10/2008 | Periyalwar et al. | 375/133 |

FOREIGN PATENT DOCUMENTS

| | | |
|---|---|---|
| EP | 1565017 A2 | 8/2005 |
| JP | 2002305477 A | 10/2002 |
| KR | 20040034962 A | 4/2004 |
| WO | 2006010958 A2 | 2/2006 |

OTHER PUBLICATIONS

International Search Report and Written Opinion of the International Searching Authority for International application No. PCT/US2007/024847 mailed Jun. 20, 2008.

International Preliminary Report on Patentability for International application No. PCT/US2007/024847 mailed Apr. 7, 2009.

International Search Report and Written Opinion of the International Searching Authority for International application No. PCT/US2007/011366 mailed Feb. 14, 2008.

Haas H et al; "Capacity Analysis of a TDD Underlay Applicable for UMTS," IEEE International Symposium on Personal, Indoor and Mobile Radio Communications. PIMRC, vol. 1, Sep. 12, 1999, five pages.

International Preliminary Report on Patentability for International application No. PCT/US2007/011366 mailed Dec. 11, 2008.

* cited by examiner

CONTROLLING UPLINK POWER FOR PICOCELL COMMUNICATIONS WITHIN A MACROCELL

1. Technical Field

This invention generally relates to communication. More particularly, this invention relates to wireless communication.

2. Description of the Related Art

Wireless communication systems are well known and in widespread use. Many systems are referred to as cellular systems because of the way that wireless communication coverage is designed. Base station transceivers are arranged to provide wireless communication coverage over geographic areas surrounding the base station. The geographic area is typically referred to as a cell. The typical relatively large size or coverage area of such cells allows for them to be referred to as macrocells.

It is possible to establish smaller-sized cells within a macrocell. These are sometimes referred to as picocells. One proposed way for establishing a picocell is to provide a home base station unit or picocell base station unit that operates within a relatively limited range such as within a building, for example.

Various challenges are introduced by the possibility of having one or more picocell base station units within a macrocell. These challenges become even more complex with the potential proliferation of hundreds or even thousands of picocells within a macrocell. For example, there can be mutual, co-channel interference between a picocell base station unit and a macrocell base station. This may occur when both cells are using the same frequency or channel for downlink communications, for example.

In an uplink direction, the picocell suffers from interference when a macrocell mobile station is nearby and transmitting on an uplink. This is especially true near the edge of a macrocell where the macrocell mobile station's transmit power is typically high because of the distance to the macrocell base station. On the other hand, macrocell base stations suffer from interference when a picocell mobile station is nearby. Transmissions from mobile stations communicating within a picocell nearby the macrocell base station can deteriorate the uplink quality of service for macrocell mobile stations that are located closer to the edges of the macrocell.

The impact of mutual interference between a picocell base station unit and a macrocell base station is typically dependent on the deployment geometry and transmission power levels. The picocell uplink may not operate adequately if a macrocell mobile station is too close to the picocell base station unit. Additionally, the macrocell uplink may not operate adequately if the macrocell mobile station is near an edge of the macrocell and a picocell mobile station is relatively close to the macrocell base station.

There is a need for controlling co-channel transmissions in a hierarchical wireless communication system where picocells are located within a macrocell. This invention addresses that need.

SUMMARY

An exemplary method of communicating in a picocell within a macrocell includes determining an allowable interference from the picocell to the macrocell. A path-loss between a mobile station and the macrocell is determined. An uplink transmit power of the mobile station for communicating in the picocell is based upon the determined allowable interference and the determined path-loss.

The various features and advantages of the disclosed examples will become apparent to those skilled in the art from the following detailed description. The drawings that accompany the detailed description can be briefly described as follows.

DETAILED DESCRIPTION

Disclosed example techniques provide for dynamically adjusting an uplink transmit power of a mobile station communicating in a picocell within a macrocell. Disclosed examples guarantee a controlled amount of interference at the macrocell base station while providing for a reliable, adjustable transmit power for communications within a picocell.

Figure 1:
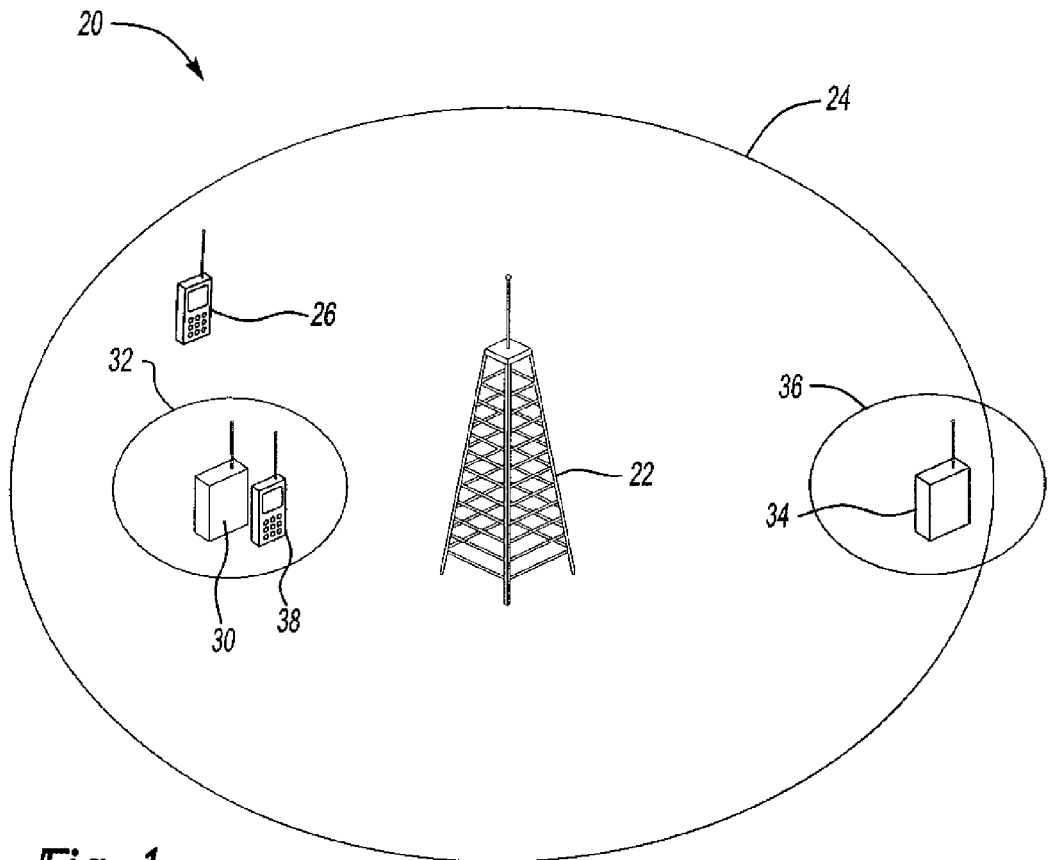
FIG. 1 schematically illustrates selected portions of a wireless communication system that is useful with an embodiment of this invention.

FIG. 1 schematically illustrates selected portions of a communication system 20. A base station 22 includes a base station transceiver unit and appropriate radio communication equipment for conducting wireless communications in a generally known manner. The base station 22 establishes a wireless communication coverage area 24 that is referred to as a macrocell for purposes of discussion. The geographic region of the macrocell 24 will depend, in part, on the capabilities of the base station 22 and the surrounding geography. There are known techniques for establishing a desired macrocell coverage area.

Within the macrocell 24 a mobile station 26 is capable of conducting wireless communications by communicating with the base station 22 in a known manner. The mobile station 26 is referred to as a macrocell mobile station for purposes of discussion because it is communicating with the base station 22 of the macrocell 24. Within the macrocell 24 there is a picocell base station unit (PCBSU) 30 that provides wireless communication coverage within a picocell 32. As can be appreciated from the illustration, the size of the coverage area of the picocell 32 is much smaller than that of the macrocell 24. In this example, the picocell 32 is contained entirely within the coverage area of the macrocell 24.

Another PCBSU 34 provides coverage within a corresponding picocell 36. In this example, the picocell 36 is at least partially within the macrocell 24.

As schematically shown, the PCBSU 30 is relatively closer to the base station 22 or the center of the macrocell 24 compared to the PCBSU 34. The macrocell mobile station 26 is relatively close to the PCBSU 30 and near an edge of the macrocell 24. The PCBSU 34 is in relatively close proximity to an edge of the macrocell 24. The relative locations of the PCBSUs 30 and 34 and the mobile station 26 with respect to the base station 22 have an impact on the uplink channel performance within the macrocell and the picocells, respectively.

Figure 2:
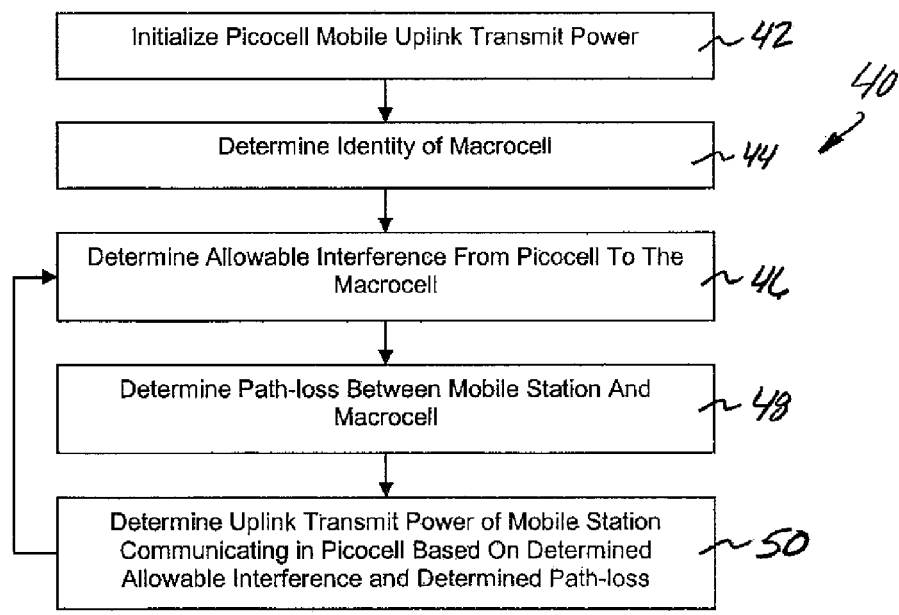
FIG. 2 is a flowchart diagram summarizing one example approach.

FIG. 2 includes a flowchart diagram 40 that summarizes one example approach for controlling uplink transmit power of a mobile station 38 communicating within the picocell 32, for example. At 42, a picocell mobile uplink transmit power is initialized by the PCBSU 30. One example includes initializing the picocell mobile uplink transmit power at a fixed amount based upon a predetermined value programmed into the PCBSU 30. In one example, this is set to the smallest value that can provide a pre-defined level of uplink range or quality for picocell mobile stations in a typical environment where the PCBSU 30 would expect to be employed. For example, a desired uplink quality for picocell mobiles within a building will have a predefinable uplink transmit power. The maximum uplink transmit power is selected to cause minimum interference to outdoor macrocell mobile stations.

In another example, the initialized picocell mobile uplink transmit power is based upon a value received by the PCBSU 30 from another device that has information regarding the location of the PCBSU 30 within the macrocell 24. For example, the distance between the PCBSU 30 and the macrocell base station 22 may be useful for setting an initial uplink transmit power value.

At 44, the PCBSU 30 identifies the macrocell 24. In one example, the PCBSU 30 receives a scrambling code or pseudo random noise offset of the base station 22, which is a cell code that provides an identification of the macrocell. In an example where a reliable detection of the cell code is not possible, the PCBSU 30 gathers information from other PCBSUs in a vicinity of the PCBSU 30 regarding measurements of cell codes taken by those PCBSUs. The cell code that is the strongest code commonly received by all such PCBSUs is selected as the cell code of the macrocell 24.

At 46, a determination is made regarding an allowable interference from the picocell to the macrocell. The maximum allowed interference amount may be fixed based upon operating parameters of the macrocell base station 22, for example. In another example, the maximum allowed interference is determined on an ongoing basis responsive to current macrocell performance including, for example, an amount of macrocell traffic and currently experienced amounts of noise and other interference at the macrocell base station 22.

In the event that the PCBSU 30 is not able to directly identify the macrocell, a save low power value for the maximum mobile transmit power can be used until more detailed information becomes available to the PCBSU 30.

The allowable interference from a particular picocell is a portion of the total allowable interference at the macrocell base station 22. Where more picocells are active within the macrocell 24, the allowable portion of interference for any one of the picocells will be less compared to a scenario where there is less picocell traffic within a macrocell. Once the PCBSU 30 determines the allowable interference from the picocell to the macrocell, the procedure in FIG. 2 proceeds onto the step indicated at 48. The mobile station 38 determines a path-loss between the mobile station 38 and the macrocell base station 22. The mobile station 38 reports the path-loss measurement to the PCBSU 30. In one example, the path-loss measurement is determined using known techniques.

In the event where a picocell mobile station cannot provide a reliable report of the path-loss between that mobile station and the macrocell base station 22, the PCBSU 30 can determine a path-loss based upon measurement results on the pilot strength of the neighboring base stations including nearby PCBSUs and the macrocell base station 22. The received macrocell pilot power and previously obtained information regarding the macrocell transmitted pilot power allows for determining the path-loss between the mobile station 38 and the macrocell base station 22.

At 50, the uplink transmit power of the mobile station communicating in the picocell is determined based upon the allowable interference from the picocell to the macrocell and the determined path-loss. The path-loss provides information regarding how much interference will be received at the macrocell base station 22 based upon a transmission from the mobile station 38. Setting the uplink transmit power of the mobile station 38 to keep that amount of interference within the allowable interference maintains effective uplink communications for macrocell mobile stations and allows for setting the uplink transmit power of a picocell mobile station to achieve reliable picocell communications.

The steps outlined at 46 through 50 in the illustrated example are repeated in regular intervals (to adapt to changes in the path-loss between the picocell mobile station and the macrocell) on a selected basis. Updating the determined allowable interference and the path-loss between the mobile station and the macrocell allows for controlling the uplink transmit power in the picocell responsive to changing conditions, for example.

In one example, the uplink transmit power of the mobile station is kept below a maximum transmit power limit for the picocell mobile station. In one example, the maximum transmit power limit for the picocell mobile station is based upon a ratio of the maximum allowed interference at the macrocell to the determined path-loss between the mobile station and the macrocell base station. In one example, the maximum transmit power limit of the picocell mobile station is referred to as $P_{pico,max}$ and is described by the equation $$P_{pico,max} = \frac{P_{Iallowed}^{(NodeB)}}{G_{Path-loss}^{(picoUE-NodeB)}(d)};$$

where the numerator is the maximum allowed interference at the macrocell and G is the path loss. The uplink transmit power for the mobile station P can be described using the following equation:

$$P_{DATA}^{(pico)} = \frac{\beta(P_{NOISE} + P_{INTERFERENCE})}{G_{Path-loss}^{(pico)}(d)};$$

where $\beta$ is a desired signal to interference noise ratio over the interference caused by macrocell mobile stations and noise. In the equation, $P_{NOISE}$ and $P_{INTERFERENCE}$ are the amounts of noise and interference, respectively, within the picocell. G is the path-loss within the picocell between the mobile station 38 and the PCBSU 30, for example. The value for the uplink transmit power of the mobile station is kept below $P_{PICO,MAX}$. In one example, the uplink transmit power is kept below a selected percentage of the maximum transmit power limit. For example, the uplink transmit power of the mobile station is kept below 90% of the maximum transmit power limit so that a remainder 10% is reserved for pilot transmission in the picocell.

The above-described techniques use downlink pilot measurements in combination with information on pilot transmit powers to dynamically adjust the uplink transmit power of mobile stations communicating in picocells subject to a maximum interference limit at the macrocell base station. In this way, the uplink power is limited by the channel loss to the macrocell and the number of other mobile stations transmitting to picocell base stations at the same time. The above-described techniques guarantee a controlled amount of interference at the macrocell.

One advantage to the disclosed techniques is that they does not require a fixed transmit power for a picocell or any mobile station within the macrocell. Instead, the mobile station transmit power within picocells can be adapted based upon pilot measurements from the macrocell and information on the macrocell pilot power. The adaptation of the uplink transmission power of picocell mobile stations cab be implemented to achieve a required signal-to-noise ratio for a requested link throughput in a picocell while keeping the transmit power subject to the maximum power constraint that is dependent on the path-loss to the macrocell. As a result, the maximum uplink power associated with a picocell is limited when the picocell is close to the macrocell base station and increased with increased separation between the picocell and the macrocell base station. The increased separation may be a function of distance between the PCBSU 30 and the macrocell base station or a function of walls or other structures surrounding the PCBSU 30 that interrupt a line-of-sight between a picocell mobile station and the macrocell base station.

The disclosed example techniques allow for an automated configuration of picocell mobile station transmit power on an uplink. An interference limit of one or many PCBSUs to the uplink of macrocell mobile stations can be specified. Additionally, the disclosed techniques remove the uncertainly of interference levels caused by random picocell deployment in an overlay network within a macrocell and guarantees low impact on the macrocell by limiting the caused interference to a specified interference budget allocated to each PCBSU on the macrocell uplink at any given time.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of communicating in a picocell within a macrocell, comprising the steps of:
   determining an allowable interference from a picocell mobile station to a macrocell base station;
   determining a path-loss between the picocell mobile station and the macrocell base station;
   determining a maximum transmit power limit of the picocell mobile station for communicating in the picocell based upon the determined allowable interference and the determined path-loss;
   setting an uplink transmit power of the picocell mobile station below a selected percentage of the determined maximum transmit power limit; and
   reserving a remainder of the determined maximum transmit power limit for picocell base station pilot signal transmission.

2. The method of claim 1, comprising
   determining the maximum transmit power limit as a ratio of the determined allowable interference to the determined path-loss.

3. The method of claim 1, comprising
   updating the determined allowable interference and the determined path-loss; and
   responsively updating the determined maximum transmit power limit of the picocell mobile station.

4. The method of claim 1, comprising
   identifying the macrocell base station by at least one of
   detecting a cell code of the macrocell base station by the picocell base station; or
   determining a strongest detected cell code detected by a plurality of other picocell base stations in a vicinity of the picocell base station as an indicator of the macrocell base station cell code.

5. The method of claim 1, comprising determining the path-loss from at least one of
   i) a path-loss measurement report from the picocell mobile station; or
   ii) determining a transmit pilot power of the macrocell base station;
      determining a measured pilot power of a plurality of base stations in a vicinity of the picocell base station including a measured macrocell base station power; and
      determining the path-loss based on the measured macrocell base station pilot power and the transmit pilot power of the macrocell base station.

6. The method of claim 1, comprising
   determining a total allowable interference to the macrocell base station; and
   allocating a portion of the total allowable interference as the determined allowable interference based on an amount of active picocell traffic in the macrocell.

7. The method of claim 6, comprising
   determining the total allowable interference to the macrocell base station as at least one of
   a fixed value, or
   a function of a current macrocell base station performance.

8. The method of claim 1, comprising
   initializing an uplink transmit power for communications in the picocell based on at least one of
   a received initial uplink transmit power level indication that is based on a geographic relationship between the picocell and the macrocell; or
   a preset initial uplink transmit power provided to the picocell base station.

9. A method of communicating in a picocell within a macrocell, comprising the steps of:
   determining an allowable interference from a picocell mobile station to a macrocell base station;
   determining a path-loss between the mobile station and the macrocell base station;
   determining an uplink transmit power of the mobile station for communicating in the picocell based upon the determined allowable interference and the determined path-loss;
   determining a total allowable interference to the macrocell base station; and
   allocating a portion of the total allowable interference as the determined allowable interference based on an amount of active picocell traffic in the macrocell.

10. The method of claim 9, comprising
    determining the total allowable interference to the macrocell base station as at least one of
    a fixed value, or
    a function of a current macrocell base station performance.

11. A picocell base station, comprising
    a controller that is configured to
    determine an allowable interference from a picocell mobile station to a macrocell base station, wherein the picocell base station is within a coverage area of the macrocell base station;

determine a path-loss between the picocell mobile station and the macrocell base station;

determine a maximum transmit power limit for the picocell mobile station for communicating in the picocell based upon the determined allowable interference and the determined path-loss; and set an uplink transmit power of the picocell mobile station below a selected percentage of the determined maximum transmit power limit wherein the controller is configured to reserve a remainder of the determined maximum transmit power limit for picocell base station pilot signal transmission.

12. The picocell base station of claim 11, wherein the controller is configured to initialize an uplink transmit power for communications in the picocell based on at least one of a received initial uplink transmit power level indication that is based on a geographic relationship between the picocell and the macrocell; or a preset initial uplink transmit power provided to the picocell base station.

13. The picocell base station of claim 11, wherein the controller is configured to identify the macrocell base station by at least one of detecting a cell code of the macrocell base station by the picocell base station; or determining a strongest detected cell code detected by a plurality of other picocell base stations in a vicinity of the picocell base station as an indicator of the macrocell base station cell code.

14. The picocell base station of claim 11, wherein the controller is configured to determine the path-loss from at least one of i) a path-loss measurement report from the picocell mobile station; or ii) a transmit pilot power of the macrocell base station, and iii) a measured pilot power of a plurality of base stations in a vicinity of the picocell base station including a measured macrocell base station power.

15. A picocell base station, comprising a controller that is configured to determine an allowable interference from a picocell mobile station to a macrocell base station, wherein the picocell base station is within a coverage area of the macrocell base station;

determine a path-loss between the picocell mobile station and the macrocell base station;

determine a maximum transmit power limit for the picocell mobile station for communicating in the picocell based upon the determined allowable interference and the determined path-loss; and set an uplink transmit power of the picocell mobile station below a selected percentage of the determined maximum transmit power limit wherein the controller is configured to determine the maximum transmit power limit as a ratio of the determined allowable interference to the determined path-loss.

16. A picocell base station, comprising a controller that is configured to determine an allowable interference from a picocell mobile station to a macrocell base station, wherein the picocell base station is within a coverage area of the macrocell base station;

determine a path-loss between the picocell mobile station and the macrocell base station;

determine a maximum transmit power limit for the picocell mobile station for communicating in the picocell based upon the determined allowable interference and the determined path-loss; and set an uplink transmit power of the picocell mobile station below a selected percentage of the determined maximum transmit power limit wherein the controller is configured to determine a total allowable interference to the macrocell base station; and allocate a portion of the total allowable interference as the determined allowable interference based on an amount of active picocell traffic in the macrocell.

17. The picocell base station of claim 16, wherein the controller is configured to determine the total allowable interference to the macrocell base station as at least one of a fixed value, or a function of a current macrocell base station performance.

18. The picocell base station of claim 16, wherein the controller is configured to initialize an uplink transmit power for communications in the picocell based on at least one of a received initial uplink transmit power level indication that is based on a geographic relationship between the picocell and the macrocell; or a preset initial uplink transmit power provided to the picocell base station.

19. The picocell base station of claim 16, wherein the controller is configured to identify the macrocell base station by at least one of detecting a cell code of the macrocell base station by the picocell base station; or determining a strongest detected cell code detected by a plurality of other picocell base stations in a vicinity of the picocell base station as an indicator of the macrocell base station cell code.

20. The picocell base station of claim 16, wherein the controller is configured to determine the path-loss from at least one of i) a path-loss measurement report from the picocell mobile station; or ii) a transmit pilot power of the macrocell base station, and iii) a measured pilot power of a plurality of base stations in a vicinity of the picocell base station including a measured macrocell base station power.

* * * * *